(12) United States Patent
Wuidart et al.

(10) Patent No.: US 8,745,107 B2
(45) Date of Patent: Jun. 3, 2014

(54) LOCKING OF AN INTEGRATED CIRCUIT

(75) Inventors: Luc Wuidart, Pourrieres (FR); Fabrice Marinet, Chaieauneuf le Rouge (FR)

(73) Assignee: STMicroelectronics S.A., Montrouge (FR)

( * ) Notice: Subject to any disclaimer, the term of this patent is extended or adjusted under 35 U.S.C. 154(b) by 1689 days.

(21) Appl. No.: 11/663,571

(22) PCT Filed: Sep. 27, 2005

(86) PCT No.: PCT/FR2005/050787
§ 371 (c)(1),
(2), (4) Date: Nov. 7, 2007

(87) PCT Pub. No.: WO2006/035185
PCT Pub. Date: Apr. 6, 2006

(65) Prior Publication Data
US 2008/0243973 A1    Oct. 2, 2008

(30) Foreign Application Priority Data

Sep. 28, 2004 (FR) ........................ 0452183

(51) Int. Cl.
G06F 3/00 (2006.01)
H03K 19/00 (2006.01)
G06F 11/30 (2006.01)
G06F 12/14 (2006.01)

(52) U.S. Cl.
USPC .............. 708/135; 326/8; 713/189; 726/17; 726/27

(58) Field of Classification Search
USPC ........................ 326/8; 380/277–286, 44–47;
713/189–194; 726/2–6, 17–21, 26–30;
708/135, 491–492
See application file for complete search history.

(56) References Cited

U.S. PATENT DOCUMENTS

| | | | | |
|---|---|---|---|---|
| 5,068,894 A | * | 11/1991 | Hoppe | 713/172 |
| 5,191,608 A | | 3/1993 | Geronimi | |
| 5,247,577 A | * | 9/1993 | Bailey et al. | 713/191 |
| 5,539,828 A | * | 7/1996 | Davis | 713/173 |
| 5,740,403 A | * | 4/1998 | Kowalski | 711/164 |
| 5,771,287 A | * | 6/1998 | Gilley et al. | 713/191 |
| 5,857,024 A | * | 1/1999 | Nishino et al. | 713/172 |

(Continued)

FOREIGN PATENT DOCUMENTS

FR 2503423 A 10/1982

OTHER PUBLICATIONS

Blaise Gassend , Dwaine Clarke , Marten van Dijk , Srinivas Devadas; "Silicon physical random functions"; Proceedings of the 9th ACM conference on Computer and communications security; Nov. 18-22, 2002.*

(Continued)

*Primary Examiner* — Chuong D Ngo
*Assistant Examiner* — Matthew Sandifer
(74) *Attorney, Agent, or Firm* — Wolf, Greenfield & Sacks, P.C.

(57) ABSTRACT

A method for protecting an integrated circuit. According to the method, the start-up of all, or part, of the circuit is determined in the presence of a key which is recorded in a non-volatile manner in the circuit, following the production thereof, and depends on at least one first parameter which is present in a non-volatile manner in the circuit after the production thereof.

22 Claims, 2 Drawing Sheets

(56) References Cited

U.S. PATENT DOCUMENTS

| | | | |
|---|---|---|---|
| 6,000,032 A * | 12/1999 | Millard | 726/2 |
| 6,047,068 A | 4/2000 | Rhelimi et al. | |
| 6,065,113 A * | 5/2000 | Shiell et al. | 712/227 |
| 6,152,367 A * | 11/2000 | Kowalski | 235/382 |
| 6,161,213 A * | 12/2000 | Lofstrom | 324/750.15 |
| 6,575,372 B1 * | 6/2003 | Everett et al. | 235/492 |
| 6,761,319 B2 * | 7/2004 | Peachman et al. | 235/492 |
| 7,210,634 B2 * | 5/2007 | Sapiro | 235/492 |
| 7,266,848 B2 * | 9/2007 | Moyer et al. | 726/29 |
| 7,274,283 B2 * | 9/2007 | Yosim et al. | 340/5.74 |
| 7,334,131 B2 * | 2/2008 | Orlando et al. | 713/189 |
| 7,366,906 B2 * | 4/2008 | Enokida | 713/175 |
| 7,386,732 B2 * | 6/2008 | Kelley et al. | 713/184 |
| 7,552,343 B2 * | 6/2009 | Desmicht et al. | 713/189 |
| 7,603,637 B2 * | 10/2009 | Haehn | 716/136 |
| 7,644,278 B2 * | 1/2010 | Catherman et al. | 713/175 |
| 7,827,413 B2 * | 11/2010 | Liardet et al. | 713/189 |
| 7,840,803 B2 * | 11/2010 | Clarke et al. | 713/168 |
| 7,941,672 B2 * | 5/2011 | Wuidart et al. | 713/189 |
| 2002/0047049 A1 | 4/2002 | Perron et al. | |
| 2002/0188857 A1 * | 12/2002 | Orlando et al. | 713/193 |
| 2003/0102493 A1 * | 6/2003 | Wuidart et al. | 257/200 |
| 2003/0151539 A1 * | 8/2003 | Wuidart et al. | 341/200 |
| 2003/0151942 A1 * | 8/2003 | Bardouillet et al. | 365/148 |
| 2003/0181025 A1 * | 9/2003 | Wuidart et al. | 438/514 |
| 2004/0168072 A1 | 8/2004 | Teglia | |
| 2010/0215180 A1 * | 8/2010 | Belenky et al. | 380/278 |

OTHER PUBLICATIONS

International Search Report from corresponding International Application No. PCT/2005/050787 filed Sep. 27, 2006.

* cited by examiner

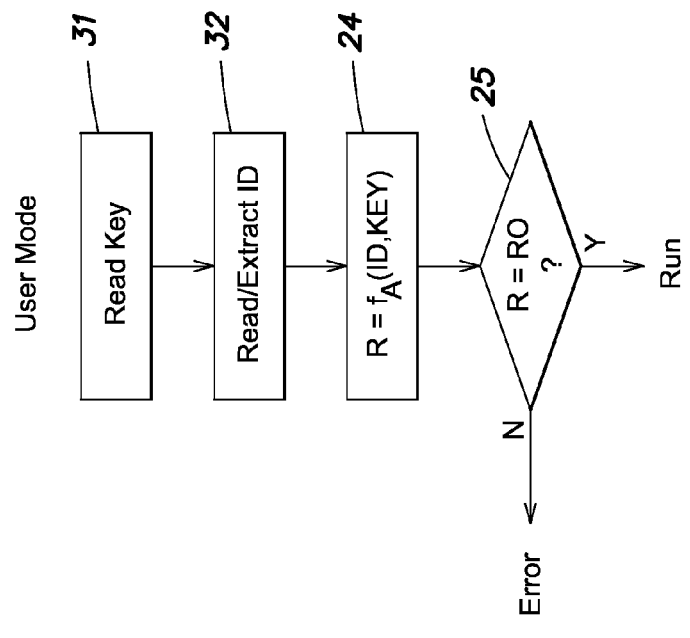
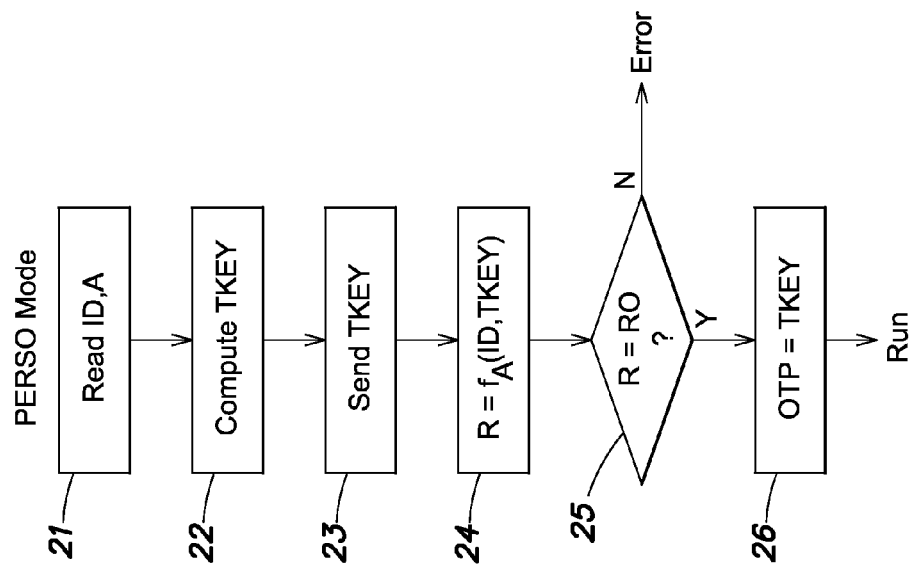
FIG. 3B
FIG. 3A

LOCKING OF AN INTEGRATED CIRCUIT

FIELD OF THE INVENTION

The present invention generally relates to integrated circuits, and more specifically to the protection of the manufacturing of such circuits.

The present invention applies to any integrated circuit, whatever the electronic element or device in which it is housed.

DISCUSSION OF THE RELATED ART

To protect an integrated circuit, one or several mechanisms conditioning the access to critical functions of the circuit on provision by the user of authorized keys (digital words) are generally provided. This protection technique is a so-called downstream technique, since the actual manufacturing is not protected. In fact, the circuit applications are those protected by the keys, which are often input into the non-volatile memory by the application provider and distributed to the users.

A disadvantage of known solutions is that they do not avoid pirate manufacturings. In particular, they do not avoid forming of integrated circuits based on a knowledge of the circuit layout, enabling restoring the set of circuit manufacturing masks. Now, it is currently possible by reverse engineering to restore the different masks used for the manufacturing of an integrated circuit. With an available set of masks (a mask represents one or several circuits), a manufacturer is capable of determining the different areas of deposition, etch, implantation, metallizations, etc. and of defining, for a whole wafer comprising several integrated circuits reproducing the same mask, the different areas of deposition, etch, implantation, metallizations, etc. Even if an identifier is hidden in the integrated circuit chip structure, it is generally through the masks, so that by reproducing these masks, the manufacturer is capable of manufacturing a pirate batch having a correct identifier. In the case of introductions of keys by the application providers, the generated pirate circuits are also functional.

Further, a same subcontractor is now likely to manufacture circuits for several designers, which provide him with the appropriate sets of masks. The principal is then not able to protect himself against an unscrupulous subcontractor using his set of masks for an unauthorized production.

SUMMARY OF THE INVENTION

The present invention aims at improving the protection of integrated circuits against pirate manufacturings.

The present invention more specifically aims at preventing use of integrated circuits which would originate from a pirate manufacturing, by use of the circuit layout, by use of a set of masks, etc.

To achieve these and other objects, the present invention provides a method for protecting an integrated circuit, consisting of conditioning the starting of all or part of the circuit to the presence of a key, recorded in non-volatile fashion in the circuit subsequently to its manufacturing and depending on at least one first parameter present in non-volatile fashion in the circuit at the end of its manufacturing.

According to an embodiment of the present invention, the method consists of:

applying a calculation function integrated to the circuit at least to said key; and checking whether the result of the calculation complies with a predetermined value.

According to an embodiment of the present invention, the recording of said key in the integrated circuit is only allowed by said circuit if the application of said function to the key complies with said value.

According to an embodiment of the present invention, said function has as operands at least said key and said first parameter formed of an identification number of the circuit.

According to an embodiment of the present invention, said key is generated, outside of the circuit, based on said parameter and the function to comply with said value.

According to an embodiment of the present invention, the functions takes into account a second parameter present in non-volatile fashion in the circuit at the end of its manufacturing.

According to an embodiment of the present invention, said second parameter depends on the position of the chip containing the integrated circuit in a wafer supporting several chips.

According to an embodiment of the present invention, said parameter differs from one integrated circuit chip to another or from one group of chips to another.

The present invention also provides a method for personalizing an integrated circuit comprising a calculation function, at least one first parameter present in non-volatile fashion in the circuit at the end of its manufacturing and an element for calculating the function and for checking the result with respect to a predetermined value, consisting of:

calculating, outside of the circuit and based on said parameter and on the function, a key such that the application of the function to the key provides a result complying with a predetermined property;

transferring the calculated key to the circuit;

applying, in the circuit, said calculation function to the calculated key; and allowing the recording of the key in the integrated circuit in non-volatile fashion only if the result complies with said property.

The present invention also provides a method for manufacturing integrated circuit chips, consisting of varying within a same set of masks defining several circuits, a calculation function depending on a parameter for the implementation of the protection method.

The present invention also provides an integrated circuit comprising an element for storing a key in non-volatile fashion and an element for storing or extracting at least one parameter from the chip, comprising means for conditioning the starting of all or part of the circuit to the presence of the key in the circuit, this key depending on said parameter.

BRIEF DESCRIPTION OF THE DRAWINGS

The foregoing and other objects, features, and advantages of the present invention will be discussed in detail in the following non-limiting description of specific embodiments in connection with the accompanying drawings, in which:

FIG. 3A illustrates, in a simplified flowchart, an embodiment of a phase of key generation in an integrated circuit according to the present invention; and FIG. 3B illustrates, in a simplified flowchart, an embodiment of a phase for starting an integrated circuit protected by the method of the present invention.

DETAILED DESCRIPTION

Figure 1:
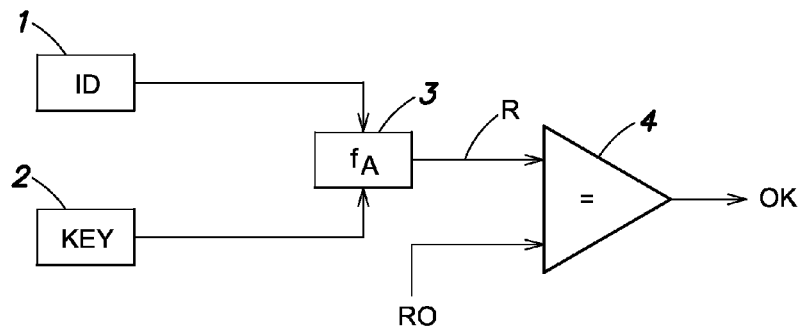
FIG. 1 very schematically shows in the form of blocks an embodiment of a unit for conditioning the starting of an integrated circuit according to the present invention.

For clarity, only those steps and elements that are useful to the understanding of the present invention have been shown. In particular, the different components of an integrated circuit protected by the present invention which are linked to the application of this circuit (its destination) have not been shown, the present invention being compatible whatever the elements contained in the integrated circuit and whatever its destination.

According to a feature of the present invention, at each starting of the circuit (for example, on each powering-on or on each reset), a hardware or software process conditions this starting to the result of a calculation implementing, as operands, at least one parameter of the integrated circuit set on manufacturing and present in non-volatile fashion in the circuit at the end of a manufacturing, and at least one key input into this circuit after manufacturing.

Be it an identifier or a parameter of the calculation function, it is preferentially native in the integrated circuit. The parameter may be obtained by a network of physical parameters sensitive to manufacturing technology dispersions of the component, be set by a mask on manufacturing, or be introduced by any other means on manufacturing. Preferably, this identifier has a given dispersion (diversification) from one chip to another or from one chip batch to another.

The present invention will be described hereafter in relation with a preferred embodiment in which two parameters linked to the manufacturing are provided (an identification number and a parameter of the calculation function). It should however be noted that it more generally applies as soon as a parameter linked to the manufacturing is combined (by a logic or arithmetical calculation) with a key on which this parameter depends and which is calculated (and stored in the circuit) after manufacturing. The fact of dividing this parameter into several ones as in the preferred embodiment is functionally equivalent from the moment that it is a digital parameter. For example, noting $f_A$ the function for calculating parameter A linked to the manufacturing, ID the circuit identifier linked to the manufacturing and KEY the key, saying that a result $R=f_A(ID, KEY)$ is equivalent to saying that result $R=h_{(A, ID)}(KEY)$, h being a calculation function depending on A and on ID. The only possible difference results from the source of parameters A and ID which may, being separated, have different origins (for example, a network of physical parameters and a ROM area).

According to another feature of the present invention, the key which must be combined with the native parameter to allow or not the circuit operation depends on this parameter. In the preferred embodiment, the key is selected according to the identifier and to the calculation function combining this identifier with the key. Thus, conversely to what the present invention calls "parameters" and which correspond to values intrinsic to the chip (not modifiable from the outside or by the environment), the key is calculated after manufacturing.

FIG. 1 very schematically illustrates, in the form of blocks, an embodiment of the protection method of the present invention. This drawing illustrates an embodiment of a circuit for allowing the starting of the circuit by implementation of the present invention.

In this example, an identification number of the integrated circuit chip (block 1, ID) preferentially different from one chip to the other or from one chip group to another is intrinsically present in the integrated circuit. Identifier ID is, for example, stored by a fusible network (simplest case), extracted on each interrogation by reading of a network of physical parameters sensitive to technological dispersions (provided that the identifier is stable from one extraction to another), or obtained by any other method for generating an integrated circuit chip identifier. This identifier, which preferentially is a binary number, is however not introduced from the outside of the integrated circuit.

The integrated circuit chip to be protected also contains an element 2 of non-volatile storage of a key KEY intended to be combined by a function $f_A$ (block 3) with identifier ID. Key KEY is stored in the circuit in an initialization phase (first circuit use or test phase). However, according to the present invention, the key depends on the intrinsic parameter(s) (parameter A of function $f_A$ and/or identifier ID) of the chip.

Result R of combination function 3 is compared (block 4, =) with a predetermined value R0, preferably constant, to enable or disable the circuit starting (signal OK). The value R0 to be complied with by result R is or not the same for all the integrated circuit chips but is always set on manufacturing (preferably, in wired logic). This is especially why key KEY should, according to the present invention, be calculated according to identifier ID of the chip and to calculation function $f_A$ (and, if available, of the expected value $R0_A'$). If value R0 is differentiated, it depends on parameter A of the calculation function, and can thus be noted $R0_A$.

According to a first example, the personalization tool contains a table of correspondence between parameter A and the result $R0_A$ expected by the chip. The result is then compared with the current result to, for example, condition the state of a start flag.

According to a second example, result R0 directly is a result of flag type and is the same for all chips.

Preferably, function $f_A$ is a bijective function to enable calculation of key KEY from the outside of the circuit based on parameters ID and A, as will be seen hereafter. For example, function $f_A$ is of type A*ID+KEY (or A*KEY+ID).

As for identifier ID, parameter A conditioning calculation function $f_A$ may be set by any usual means of native storage in an integrated circuit chip.

According to a specific example of embodiment, a technique of differentiation of the masks of a same reticule may be implemented to differentiate function $f_A$ (parameter A) and possibly parameter ID. This technique consists of assembling several alternative circuits to form the reticule used to form the set of masks. For example, on reproduction of the circuit layout to form the set of manufacturing masks of several circuits, a selective implantation of a dopant of a storage element, which is different from the selective implantations of the dopants of the memorization elements of the other circuits, is provided for each circuit of the reticule. Such a technique is described in U.S. Pat. No. 6,780,716 of the applicant. Binary codes which are different from one circuit to another can then be obtained even though these circuits all originate from a same wafer.

According to another example, the coding of the metal connections is modified from one circuit to another.

This technique of integrated circuit differentiation by means of the masks has the advantage of providing a single (or at least differentiated) parameter for each integrated circuit chip which is not observable, especially in optical fashion. This secures the manufactured chip and especially the subsequent use of this parameter.

An advantage of differentiating the combination function (more generally all or part of the parameters on which the key depends) within a same reticule is that this protects the integrated circuit manufacturing by protecting, in a way, the masks. Indeed, to be able to manufacture operational products, an unauthorized manufacturer will have to examine by reverse engineering all the products obtained from a set of masks to know all the different functions used to thus obtain a set of reproducible masks. If not, and if it performs an examination of a single product, this will not enable him to determine which function $f_A$ of the concerned product will not be valid for the other products.

Figure 2:
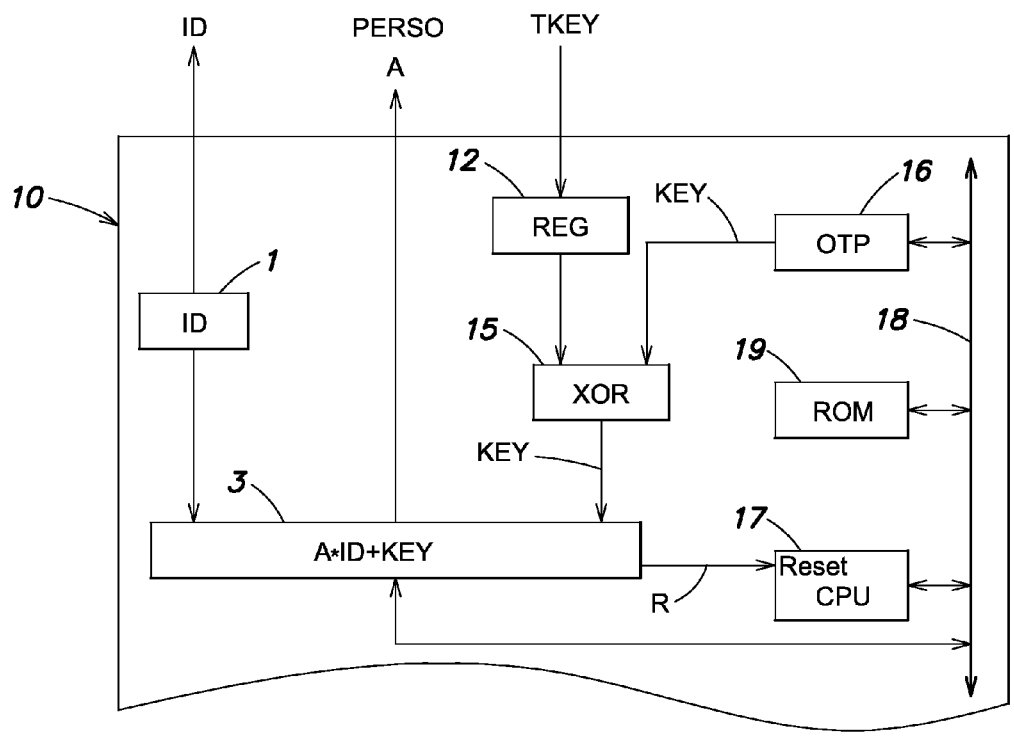
FIG. 2 schematically shows in the form of blocks an example of a simplified architecture of an integrated circuit according to a preferred embodiment of the present invention.

FIG. 2 very schematically shows in the form of blocks the elements contained in an integrated circuit 10 for the implementation of the present invention. In FIG. 2, only those elements constitutive of circuit 10 which are used by the present invention have been illustrated. This circuit thus further comprises many other circuits or elements which depend on its application.

Circuit 10 comprises an area 1 of generation, extraction, or storage of identification number ID. Area 1 very schematically shown may correspond to a non-volatile register containing the number after an initial extraction, to a circuit of extraction of the number based on the network of physical parameters, for example, on each powering-on of the chip, etc. Circuit 10 also comprises one or several registers 12 (REG) of temporary storage of a key TKEY introduced from the outside of the circuit after its calculation (in practice from a personalization tool PERSO). The output of register 12 is sent onto an element 15, of bit-to-bit XOR type, of logic combination with the output of an element 16 (OTP) intended to contain key KEY in non-volatile fashion after its validity has been checked as will be seen hereafter in relation with FIG. 3A. The output of combination element 15 provides a key KEY to a block 3 (A*ID+KEY) of calculation of a result based on function $f_A$ (selected for example to correspond to a straight line).

Preferably, logic or arithmetic function $f_A$ is achieved in wired logic on manufacturing of the circuit. The aim is to block the circuit operation in case of a mismatch with the result. In the shown example, block 3 provides a signal R corresponding to validation signal OK of FIG. 1 to free a reset input RESET of a central unit 17 comprised by integrated circuit 10. The case of an integrated circuit 10 provided with advanced calculation means (central processing unit) communicating via one or several buses 18 with different peripherals and memories, among which memory 16 (OTP) and generally a memory 19 (ROM) containing an application program of the integrated circuit, is considered. Other elements such as a volatile memory (RAM) and input/output circuits are also provided although not shown in circuit 10.

As an alternative, key KEY is directly input into the non-volatile memory on generation thereof (gate 15 is then omitted). The embodiment of FIG. 2 however is a preferred embodiment since it enables checking the correct generation of the key on parameterizing of the circuit as will be seen hereafter in relation with FIGS. 3A and 3B.

FIG. 3A is a flowchart illustrating the recording of a key KEY in the circuit of FIG. 10. This flowchart in practice corresponds to a personalization phase PERSO MODE (for example, of initialization or test) performed at the end of the manufacturing of the circuit or on first use thereof.

Since key KEY depends on the chip intrinsic parameters, the personalization tool must be capable of identifying these parameters to calculate the key. For example, these parameters, which are in practice digital words, are provided by the circuit to be personalized to the personalization tool.

According to another example in which the designer provides the manufacturer (caster) directly with the set of reticules, the position of the integrated circuit chip on the wafer is identifiable, for example, by its position on the wafer. This position is detectable by the personalization tool, the personalization (at least the phase of calculation and of recording of key KEY) being in this case carried out by whole wafers. The personalization tool further contains a table of correspondence between the chip position and the parameter of the function which has been implanted therein. It can then calculate the key to be stored in the integrated circuit. In this case, the circuit provides the personalization tool with its identifier ID only.

Preferably, the personalization is not performed by the circuit manufacturer (caster) but by the designer or by the assembler in charge of assembling the circuit (generally, the designer's client). This personalization is generally performed in a secure environment.

A first step (block 21, READ ID, A) consists of reading identifier ID of the chip and the parameter of function A which is provided by circuit 10 to personalization tool to enable it to calculate key KEY. In practice, the personalization tool is a digital system of computer type, provided with means of calculation and interface of connection to circuit 10, possibly via bus 18.

The key calculation is performed by the personalization tool (block 22, COMPUTE TKEY). To perform the key calculation, the personalization tool must know not only result R0 expected by the circuit, but also function f (more specifically, its inverse) to be able to recover, based on parameter A, function $f_A$ specific to the circuit. In the example of a straight line (R=A*ID+KEY), the tool in fact applies formula TKEY=R−A*ID.

Calculated key TKEY is then sent by the personalization tool to circuit 10 (block 23, SEND TKEY). This key arrives in register 12 (FIG. 2) and is combined by XOR gates 15 with a word contained in memory 16. Since it is a first initialization, memory 16 only contains bits at state 0 so that key KEY provided by gates 15 corresponds to key TKEY input from the outside.

Circuit 10 (block 3) combines the key with the identifier and provides a result (block 24, R=$f_A$(ID,TKEY)).

This result is compared (block 25, R=R0?) with the expected result R0 corresponding to the constant contained in non-volatile fashion in circuit 10. If the result is incorrect (output N of test 25), the circuit does not start, or sets in an infinite loop, or starts any other appropriate error processing (ERROR) selected, for example, according to the application.

In case of a correct result (output Y of test 25), the value of key TKEY input from the outside is stored in non-volatile memory 16 (block 26, OTP=KEY) and the circuit is allowed to start (RUN).

For the case where memory 16 contains bits other than 0 (meaning either a defect of the memory, or a piracy attempt), initial key KEY is wrong and the circuit never starts.

FIG. 3B shows a simplified flowchart of the method for checking the authenticity of a circuit according to the present invention. In the case where the key has been input in accordance with the implementation mode of FIG. 3A, FIG. 3B illustrates the case of a second starting (or of a subsequent starting) of the circuit, generally corresponding to a use in user mode.

A first step (block 31, READ KEY) consists of reading the key from memory 16 of circuit 10. Then or in parallel, the identifier is extracted or read (block 32, READ/EXTRACT ID) from the chip. These two operands are combined by circuit 3 to calculate a result R (block 24, R=$f_A$(ID, KEY)). This operation is the same as the operation performed in FIG. 3A to check calculated key TKEY.

Result R is then compared with expected constant R0 (block 25), to allow or not the circuit starting.

Once started, the circuit implements the processing linked to its application which is no object of the present invention.

In an embodiment, calculated result R may be directly exploited by CPU 17 to compare this result with an expected result contained in R0M 19. In this case, the expected value can be individualized from one chip to the other or by groups of chips on manufacturing according to the implantations performed to differentiate the function. Such an embodiment enables suppressing the wired logic to calculate the function and/or brings another blocking mode.

An advantage of the present invention is that it protects the structure of an integrated circuit against pirate manufacturings, and especially against use of a set of valid masks to manufacture pirate circuits.

Of course, the present invention is likely to have various alterations, modifications, and improvements which will readily occur to those skilled in the art. In particular, different calculation or combination functions (for example, a function of symmetrical type currently used in cryptography) may be selected provided that, whatever the chip parameter(s), there exists at least one key which, when combined with this identifier by the function, provides a constant.

Similarly, the implementation of the present invention and especially the differentiation of the parameters by using techniques known per se (for example, the technique described in U.S. Pat. No. 6,780,716) is within the abilities of those skilled in the art based on the functional indications given hereabove.

Further, the present invention is compatible with any subsequent use of key KEY and of identifier ID. In particular, the present invention is compatible with other subsequent personalizations of the integrated circuit (for example, by application providers) consisting of diversifying key KEY to dedicate the circuit to certain applications or functions. The personalization phase provided by the present invention aims at protecting the manufacturing by forbidding use of a pirate circuit whatever its destination (the application for which it is intended by personalization of the application provider—transport, bank, etc.).

The invention claimed is:

1. A method for protecting an integrated circuit, the method comprising:
using the integrated circuit to receive a key generated outside of said integrated circuit,
recording the key in non-volatile fashion in the circuit subsequent to manufacturing the integrated circuit,
using the integrated circuit to perform a calculation having as operands at least the key and a parameter intrinsically present in the integrated circuit in non-volatile fashion at the end of the manufacturing, the calculation producing a result having a value dependent on values of the key and the parameter, the calculation being invertible to produce the value of the key using the values of the result and the parameter;
using the integrated circuit to determine whether the value of the result matches a stored value; and
when the integrated circuit determines that the value of the result matches the stored value, activating at least a part of the integrated circuit.

2. The method of claim 1, wherein the recording of the key in non-volatile fashion in the integrated circuit is performed in response to determining that the value of the result matches the stored value.

3. The method of claim 1, wherein said parameter is formed of an identification number of the integrated circuit.

4. The method of claim 1, wherein performing the calculation comprises performing a function, and wherein the method further comprises using the value of the parameter and the stored value to generate the value of the key outside the integrated circuit, based on the function.

5. The method of claim 1, wherein:
the parameter is a first parameter, and
using the integrated circuit to perform the calculation having as operands at least the key and the parameter comprises using the integrated circuit to perform the calculation having as operands at least the key, the parameter, and a second parameter present in non-volatile fashion in the circuit at the end of the manufacturing.

6. The method of claim 5, wherein said second parameter depends on a position of a chip containing the integrated circuit in a wafer supporting two or more chips.

7. The method of claim 1, wherein said parameter differs from one integrated circuit to another or from one group of integrated circuits to another.

8. The method of claim 1, wherein a value of the key depends on the stored value.

9. A method for personalizing an integrated circuit, the integrated circuit comprising a parameter present in non-volatile fashion in the integrated circuit at the end of manufacturing the integrated circuit and an element for calculating a function and for checking a result of the function with respect to a stored value, the method comprising:
using at least the parameter to calculate, outside the integrated circuit and based on the function, a key;
transferring the key to the integrated circuit;
using the element of the integrated circuit to calculate the function to obtain the result, the function having as operands at least the key and the parameter, the function being invertible to obtain the key using the parameter and the result;
using the integrated circuit to determine whether a value of the result matches the stored value; and
when the integrated circuit determines that the value of the result matches the stored value, recording the key in the integrated circuit in non-volatile fashion,
wherein the parameter is intrinsically present in the integrated circuit.

10. The method of claim 9, wherein using at least the parameter to calculate the key, based on the function, comprises using at least the parameter and the stored value to calculate the key, based on the function.

11. A method for manufacturing integrated circuit chips, the integrated circuit chips including a first chip and a second chip, the method comprising:
using a set of masks to manufacture the integrated circuit chips such that a first parameter of the first chip differs from a second parameter of the second chip, the first and second parameters being intrinsically present in the first and second chips, respectively, in non-volatile fashion at an end of manufacturing the integrated circuit chips,
using the first chip to receive a first key, the first key being generated outside the first chip using at least the first parameter intrinsically present in the first chip,
using the first chip to perform a first calculation having as operands at least the first key and the first parameter, the first calculation producing a first result, the first calculation being invertible to obtain the first key using the first parameter and the first result,
using the first chip to determine whether a value of the first result matches a first stored value, when the first chip determines that the value of the first result matches the first stored value, activating at least a part of the first chip, using the second chip to receive a second key, the second key being generated outside the second chip using at least the second parameter intrinsically present in the second chip, using the second chip to perform a second calculation having as operands at least the second key and the second parameter, the second calculation producing a second result, the second calculation being invertible to obtain the second key using the second parameter and the second result, using the second chip to determine whether a value of the second result matches a second stored value, when the second chip determines that the value of the second result matches the second stored value, activating at least a part of the second chip, wherein the first key differs from the second key.

12. The method of claim 11, wherein a value of the first key depends on the first stored value.

13. An integrated circuit comprising:

a first element configured to store a key in non-volatile fashion, the key having been generated outside the integrated circuit using at least one parameter intrinsically resent in the integrated circuit in non-volatile fashion at an end of manufacturing the integrated circuit;

a second element configured to store the at least one parameter or extract the at least one parameter from the integrated circuit; and means for activating at least part of the integrated circuit by:

performing a calculation having as operands at least the key and the at least one parameter, the calculation producing a result having a value dependent on values of the key and the at least one parameter, the calculation being invertible to obtain the value of the key using the at least one parameter and the result, determining whether the value of the result matches a stored value, and when it is determined that the value of the result matches the stored value, activating at least part of the integrated circuit.

14. The integrated circuit of claim 13, wherein a value of the key depends on the stored value.

15. An integrated circuit comprising:

a first element configured to store a key, the key having been generated outside the integrated circuit and depending on at least one parameter intrinsically present in the integrated circuit in non-volatile fashion at an end of a manufacturing of the integrated circuit;

a second element configured to store the at least one parameter in the integrated circuit or extract the at least one parameter from the integrated circuit; and a third element configured to activate at least part of the integrated circuit by:

performing a calculation having as operands at least the key and the at least one parameter, the calculation producing a result having a value dependent on values of the key and the at least one parameter, the calculation being invertible to obtain the value of the key using the at least one parameter and the result, determining whether the value of the result matches a stored value, and when it is determined that the value of the result matches the stored value, activating at least part of the integrated circuit.

16. The integrated circuit of claim 15, wherein a value of the key depends on the stored value.

17. A method for protecting a plurality of integrated circuits, comprising:

using a first integrated circuit of the plurality of integrated circuits to receive a key, the key depending on at least one parameter intrinsically resent in the integrated circuit;

using the first integrated circuit to calculate a function having as operands at least the key and the at least one parameter, the function producing a result having a value dependent on values of the key and the parameter, the function being invertible to obtain the value of the key using the at least one parameter and the result;

using the first integrated circuit to determine whether the value of the result matches a stored value; and when the first integrated circuit determines that the value of the result matches the stored value, activating at least a part of the first integrated circuit, wherein the at least one parameter of the first integrated circuit differs from a corresponding at least one parameter of a second integrated circuit of the plurality of integrated circuits.

18. The method of claim 17, wherein:

the key is generated outside the first integrated circuit, and the key further depends on the function and on the stored value.

19. The method of claim 17, further comprising:

when the first integrated circuit determines that the value of the result matches the stored value, storing the key in a non-volatile memory of the first integrated circuit.

20. The method of claim 17, wherein:

the at least one parameter intrinsically present in the first integrated circuit comprises an identifier and a function parameter, and the identifier and/or the function parameter depends on a position that the integrated circuit occupied on a wafer during a manufacturing of the integrated circuit.

21. The method of claim 20, further comprising selectively implanting a dopant to achieve dependence of the identifier and/or the function parameter on the position of the integrated circuit.

22. The method of claim 17, wherein a value of the key depends on the stored value.

* * * * *

UNITED STATES PATENT AND TRADEMARK OFFICE
CERTIFICATE OF CORRECTION

PATENT NO.         : 8,745,107 B2
APPLICATION NO.    : 11/663571
DATED              : June 3, 2014
INVENTOR(S)        : Luc Wuidart et al.

Page 1 of 1

It is certified that error appears in the above-identified patent and that said Letters Patent is hereby corrected as shown below:

In the Specification

At column 7, line 7 "R0M" should read --ROM--.

In the Claims

At column 9, Claim 13 at line 26 the word "resent" should read --present--.

At column 10, Claim 17 at line 18 the word "resent" should read --present--.

Signed and Sealed this
Second Day of September, 2014

Michelle K. Lee
*Deputy Director of the United States Patent and Trademark Office*